(12) United States Patent
Ritchey et al.

(10) Patent No.: US 7,146,929 B2
(45) Date of Patent: Dec. 12, 2006

(54) PEST-PROOF AND SELF-CLEANING PET FEEDING SYSTEM

(76) Inventors: Michael T. Ritchey, 1228 N. Kenneth Pl., Chandler, AZ (US) 85226; Larry K. Ball, 1340 N. Butte, Chandler, AZ (US) 85226; A. Douglas Littleton, 8170 W. Denton St., Glendale, AZ (US) 85303

( * ) Notice: Subject to any disclaimer, the term of this patent is extended or adjusted under 35 U.S.C. 154(b) by 15 days.

(21) Appl. No.: 10/889,993

(22) Filed: Jul. 12, 2004

(65) Prior Publication Data

US 2006/0005775 A1   Jan. 12, 2006

Related U.S. Application Data

(60) Provisional application No. 60/487,326, filed on Jul. 16, 2003.

(51) Int. Cl.
*A01K 5/01* (2006.01)

(52) U.S. Cl. .................................................. 119/61.53

(58) Field of Classification Search ............. 119/61.53, 119/62, 51.5, 52.1, 59, 63
See application file for complete search history.

(56) References Cited

U.S. PATENT DOCUMENTS

| | | | | |
|---|---|---|---|---|
| 2,191,811 A | * | 2/1940 | Trampier, Sr. | 119/51.5 |
| 2,584,301 A | * | 2/1952 | Melroy | 119/61.53 |
| 5,253,609 A | * | 10/1993 | Partelow et al. | 119/61.53 |
| 5,277,149 A | * | 1/1994 | East | 119/51.5 |
| 5,492,083 A | * | 2/1996 | Holladay | 119/52.1 |
| 5,564,363 A | * | 10/1996 | Soffici | 119/61.53 |
| 5,954,011 A | * | 9/1999 | Martinez | 119/62 |
| 6,167,840 B1 | * | 1/2001 | White et al. | 119/61.53 |

* cited by examiner

*Primary Examiner*—Teri Pham Luu
*Assistant Examiner*—Elizabeth Shaw

(57) ABSTRACT

A pet bowl assembly which provides protection for the food from birds by means of a swinging cover and protection from crawling insects by means of a water channel surrounding the food bowl. A pet watering dish, which provides fresh drinking water from the water channel. The water dish is sufficiently sized to allow the pets lapping to clean the bowl during each use. A combination of the food bowl and watering dish which provides protection form birds, crawling insects and contaminated drinking water. Means are provided to allow for internal cleaning of the assembly, means for use in larger constructions, means for lifting the food from the ground and means for providing food and water for extended periods of time.

14 Claims, 10 Drawing Sheets

PEST-PROOF AND SELF-CLEANING PET FEEDING SYSTEM

PROVISIONAL PATENT

This non-provisional patent follows the provisional patent 60/487,326 entitled: Pest-proof/Self-cleaning Pet Feeding System. The filing date of this provisional patent is Jul. 16, 2003.

FIELD OF INVENTION

The present invention relates to pet food and water containers and more particularly to methods for protecting pet food from birds, insects and contaminated water.

BACKGROUND OF THE INVENTION

Traditionally, pet bowls have been manufactured to feed family pets such as dogs and cats and come in many sizes and shapes. These pet bowls have been made from a sturdy material, durable to all kinds of weather and outside elements and are designed to be bottom-heavy so as not to tip over while the pet was feeding or drinking. Over the course of time, pet owners have become increasingly sensitive to the health of their animals and to the attractiveness of their outdoor living space. The use of pet feeders has a large impact upon the health of the pet and the attractiveness of the outdoor living space.

Pet owners often experience problems associated with birds that are attracted to the pet feeder. In some locals, large numbers of birds may feed from a single pet container, reducing the pet's food supply. Additionally these birds also perch on lawn furniture, trees, and ornaments waiting for a clear time to feed. While they wait, the birds drop feces on the furniture or the surface that the furniture occupies. The resulting messes are difficult to clean and may become a greater irritant to the homeowner than the loss of the pet food.

Pet bowls also experience problems related to contaminated water. Pets engage in many activities that involve eating and putting other objects into their mouths. Such activities include eating, retrieving bacteria laden objects or licking themselves. When the pet drinks the water, following these activities, contaminant objects and bacteria can be dropped into the water. This is especially true following eating when food from the pet's mouth is washed from the mouth or muzzle into the water. Over the course of time, bacteria, mold or mildew grow in the presence of these contaminants, especially in the heat of summer. Most homeowners do not have the time or capacity to change the water frequently enough to keep the pet from drinking bacteria laden water. Circumstances such as forgetfulness may lead to extended periods of time where the water is not changed and the unhealthy water makes the family pet sick.

Over the course of time, mold formations may grow on the walls of the water container. If the problem of mold becomes bad enough, it may become necessary to dispose of the watering bowl or decontaminate it with anti-bacterial chemicals to make it fit for carrying water again. The use of such chemicals may be dangerous or difficult to use safely. Therefore a need exists for a watering system which does not have these problems.

In addition to bacteria and birds, it is common for a pet owner to find that ants have found the food bowl and the food is covered with ants. Pets will typically not eat the food once it has been covered with ants. This is often the case, even if the ants have been removed from the food.

One final problem related to watering dishes are health and abdominal gas related to gulping water. Some dogs gulp their water. In the process they ingest large amounts of air, which give the animals gas. It has been found that slowing the flow of water decreases the amount of air ingested with the water.

Most pets bowls are designed for a single use, such as serving either food or water. Companion bowls are known in the present art, which combine both bowls into one assembly that serves both food and water. Pet bowls may accommodate other accessories that are intended to expand the bowl's functionality. For example, some pet bowls have been manufactured with attached storage bins allowing the dry food or water to drop down to replenish the lost or eaten contents. Thus, the bowl remains full even after the pet has eaten or drank his fill. This allows the pet owner to fill the bowl for extended periods.

Accordingly, a need exists for a convenient and simple pet bowl, which keeps away pests at a reasonable cost, provides fresh drinking water at a reasonable flow rate, uses little more space than a common pet bowl and provides food and water for extended periods.

PRIOR ART

The following patents have a bearing on this application:

U.S. Pat. No. 3,730,141—Pet Feeder (1973): This invention anticipated the need for large food and water storage compartments and the need for easy disassembly for cleaning. It does not anticipate a small watering dish that is cleaned by the licking action of the pet. Neither does it anticipate incorporating a water channel for the purpose of protecting against crawling insects. Neither does it anticipate incorporating a swing food protector.

U.S. Pat. No. 4,192,256—Combined Feeding and Watering Device for Pets, Having Integral Means for Carrying Water (1980): This invention anticipates the need for combining a food bowl with an airtight watering chamber. It does not anticipate a much smaller watering dish that is cleaned by the licking action of the pet. Neither does it anticipate incorporating a water channel for the purpose of protecting against crawling insects. Neither does it anticipate incorporating a swinging food protector.

U.S. Pat. No. 4,196,697—Feeding Apparatus (1980): This invention anticipates the need for a swinging food protector. While the swinging protector covers the food, it is not accessible from more than one direction. It does not anticipate a much smaller watering dish that is cleaned by the licking action of the pet. Neither does it anticipate incorporating a water channel for the purpose of protecting against crawling insects.

U.S. Pat. No. 4,303,039—Animal Feeder with Fluted Joint (1981): This invention anticipates the need for large food storage compartments. It does not anticipate a small watering dish that is cleaned by the licking action of the pet. Neither does it anticipate incorporating a water channel for the purpose of protecting against crawling insects. Neither does it anticipate incorporating a swing food protector.

U.S. Pat. No. 4,947,796—Dog feeder Apparatus (1990): This invention anticipated the need for large food and water storage compartments and the need for covering the food. It does not anticipate a small watering dish that is cleaned by the licking action of the pet. Neither does it anticipate incorporating a water channel for the purpose of protecting against crawling insects.

SUMMARY OF THE INVENTION

The present invention provides a pet bowl structure that provides protection of the food from birds. Another advantage of the present invention is that it provides the food protection from many crawling insects. Another advantage of the present invention is that it provides a self-cleaning system, which keeps mold, mildew and foreign matter from collecting in the watering bowl. Still another advantage of the present invention is a system of feeding that allows the pet owner to feed and water the pet less often. Another advantage of the present invention is a pet bowl structure that is relatively low in cost. Another advantage of the present invention is that it is convenient and simple to use. Still another advantage of the present invention is a system for feeding, which would require no special training of the pet. Yet another advantage of the present invention is a system which is easy to disassemble and clean as often as the owner desires. The above and other advantages of the present invention are carried out in a special pest-proof pet feeder assembly, which would keep birds, ants and other pests from entering and taking the contents of the feeder.

In one embodiment, and by way of example only, a cone is suspended over a food dish such that it is free to pivot at the top of the cone. The pet is easily capable of moving the cone aside to access the food. Alternatively, birds are not capable of moving the cone and abandon the attempt to take the food.

In another exemplary embodiment, a food container is surrounded by a channel of water that is constantly replenished as the water evaporates. The channel of water makes passage to the food bowl difficult or impossible for crawling insects. A specially configured container, filled with water, maintains the level of the water in the channel. The container may be transparent so as to make detection of the water level easier. The container is airtight except for a downward or sideward facing opening at the bottom of the container. The top of the opening is at the desired water level in the channel. When the channel is empty, water flows from the container, through the opening and into the channel. As water flows out, a vacuum is formed at the top of the container. Eventually, the water pressure at the bottom of the container drops to the level of the air pressure surrounding the food dish and the flow of water into the channel stops. When the level of the water in the channel drops below the opening in the container, air is allowed to enter the previously airtight chamber. This reduces the vacuum and allows the water to flow until the water level in the channel returns to its previous level. By this means, the level of the water in the channel is controlled to a preset level. The container is further supplied with a convenient opening to fill the container with water from a garden hose. The container is further supplied with a float or stopper to keep the water from rushing out the hole in the bottom while the container is being filled with water.

In another exemplary embodiment, a spoon shaped watering dish is provided. The size of the watering dish is sufficient to allow the pet's tongue to clean the dish while it is drinking. The level in the dish can be maintained by the same means as the previous embodiment.

In another exemplary embodiment, a food dish is protected from crawling insects by a water channel. A spoon shaped watering dish is combined with the food dish and water channel in such a way that the water channel feeds the water dish and maintains the level of the water in the dish.

In another exemplary embodiment, the previous embodiment is supplied with a swinging protector suspended or pivoted above the food dish to further protect the food from birds.

In another exemplary embodiment, the previous embodiment is further supplied with a sufficiently large water container to provide water for several days.

In yet still a further exemplary embodiment, the previous embodiment is further modified by providing a sufficiently large food storage bin to maintain the food level in the food dish at a specified level for several days.

Other independent features and advantages of the preferred pet feeding and watering assembly will become apparent from the following detailed description, taken in conjunction with the accompanying drawings which illustrate, by way of example, the principles of the invention.

DETAILED DESCRIPTION OF VARIOUS EMBODIMENTS

With reference to the drawings, food bowls and water bowls embodying the invention will be discussed.

Figure 1A:
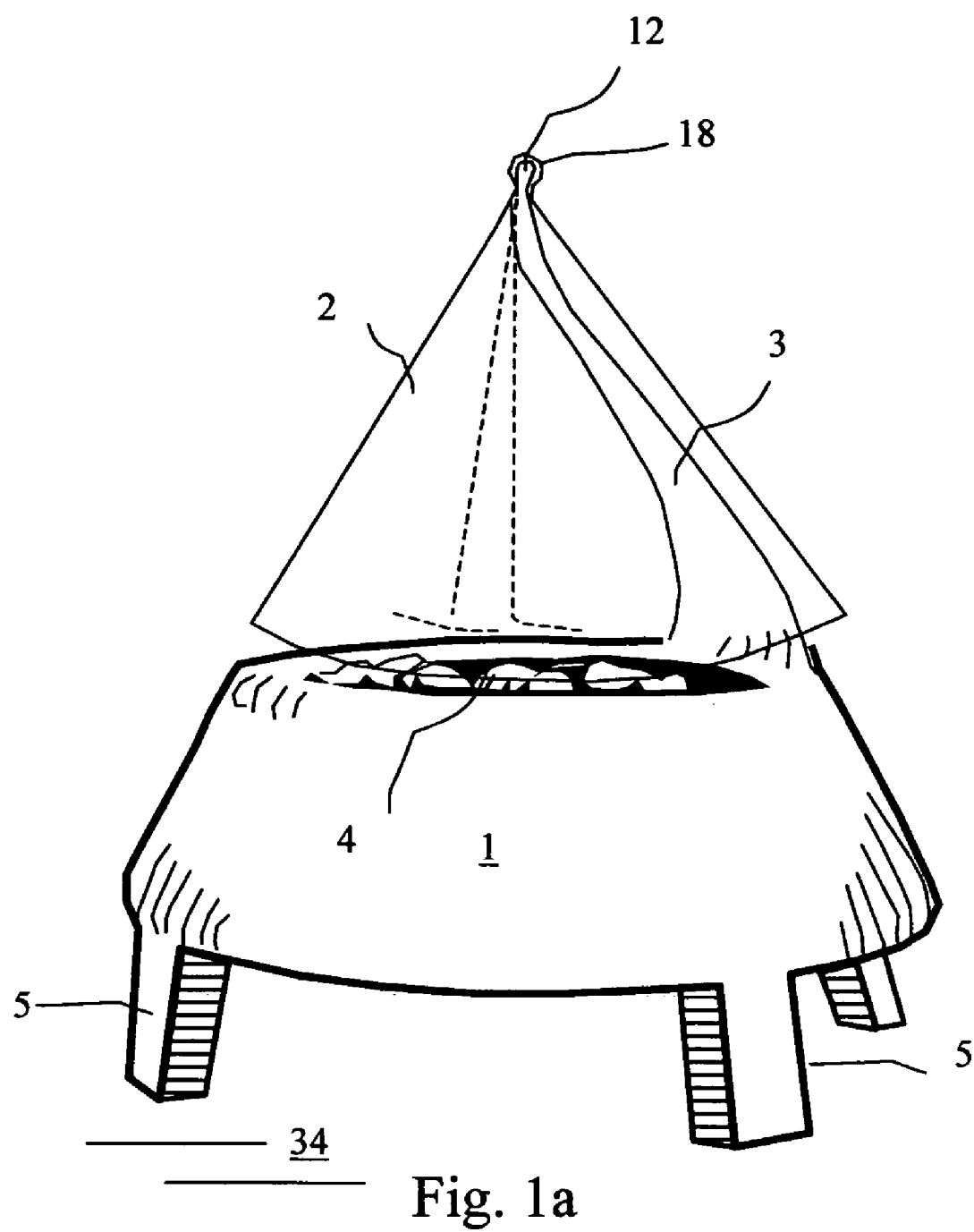
FIG. 1a illustrates an exemplary embodiment of a food dish having a cone shaped cover, suspended from an internal arm, to protect the food from birds and airborne debris.

FIG. 1a shows a cross sectional view of an exemplary embodiment of a pet food dish 1 with a protective cover 2. The food dish 1 is of common construction with the exception that provision is made to attach an arm 3 to the bowl 1. The arm is molded to or attached by other means to the bowls 1 inner edge and extends upward and inward, ending some distance above the center of the bowl 1. This arm 3 may have a spherical end 12 or a molded shape whereupon swinging protective cover 2 can freely and rotationally rest. A spherical surface 18 at the top of the conical protector accepts the spherical end 12 of the supporting arm 3. The arm 3 may also be constructed so as to be removable. For example, a slot could be molded into the side of the bowl 1 to accept an arm 3. It will also be appreciated that other suitable structures and attachment methods could be used other that the exemplary molded slot in the food dish. The arm 3 forms a structural assembly to support a conical swing assembly 2 over the food 4. This swinging assembly 2 is lightweight and attaches loosely to the extended top end of the arm 18. The cone 2 may be transparent as shown. It is supported directly over the bowl 1, covering the bowl's 1 entire outer circumference. For convenience, the bowl 1 is supported a comfortable distance above the supporting surface 34 on legs 5. Thus preventing the bowl 1 from becoming a hiding place for crawling insects.

Figure 1B:
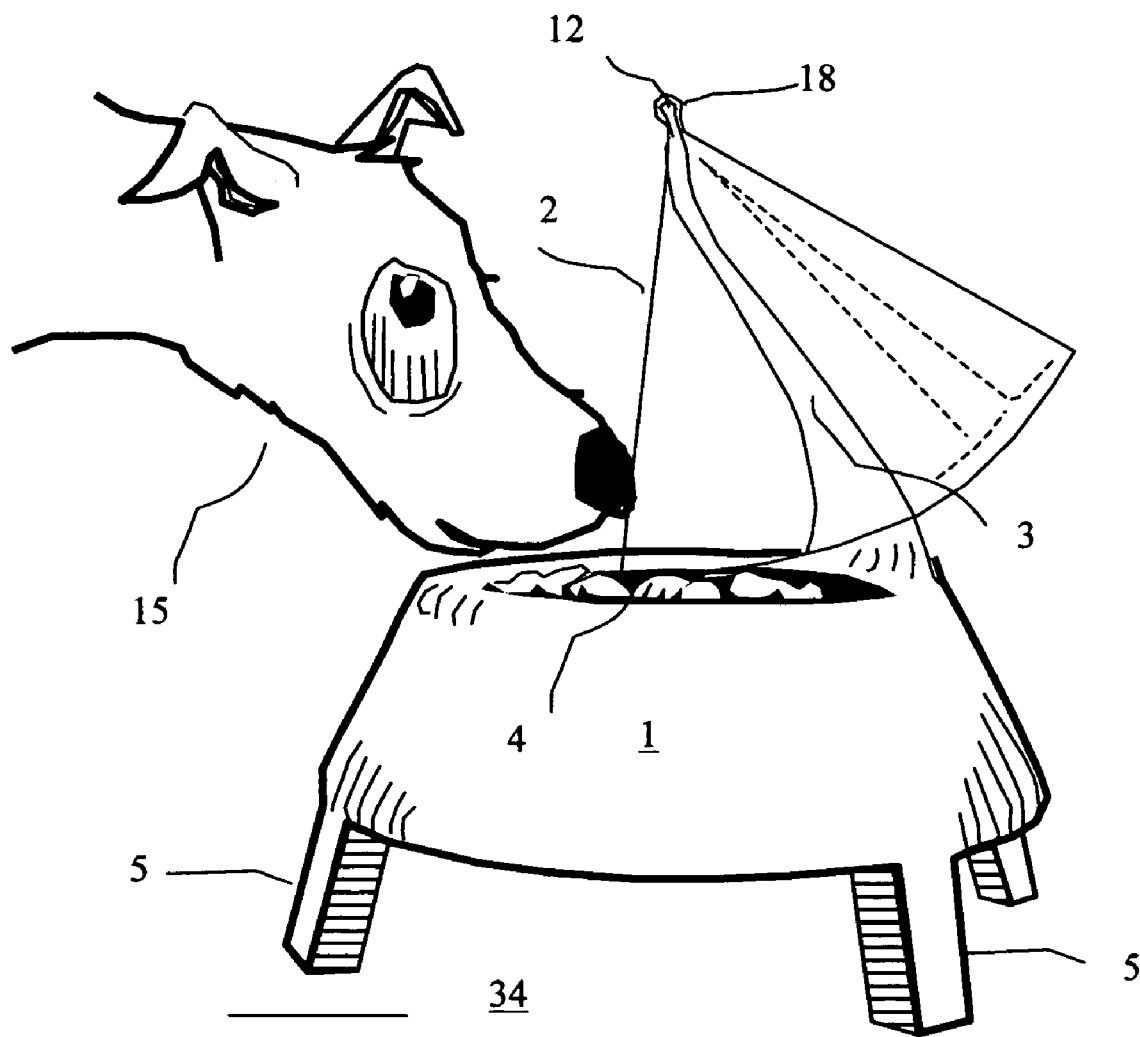
FIG. 1b illustrates the exemplary embodiment shown in FIG. 1a being accessed by a pet.

FIG. 1b illustrates the exemplary embodiment of FIG. 1a being accessed by a pet 15. The swinging assembly 2 hangs just sufficiently above the bowl 1 to allow it to move freely when the pet 15 pushes it in with its muzzle. The swinging assembly 2 then falls back into its original position over the bowl when the pet's face 15 is removed from the bowl 1 back to the attitude shown in FIG. 1a. This swinging assembly 2 covers or hides the food 4 contained in the bowl from birds and other pests when not in use by the pet 15. The conical protector 2 has sufficient thickness to protect it against common use and yet is sufficiently heavy to prevent birds from pushing it aside. It will be appreciated that other than conical structures may be used which are more aesthetically pleasing, however a conical structure is simple to produce and provides the greatest access to the food when it is pushed to the maximum distance from its normal vertical position.

Figure 1C:
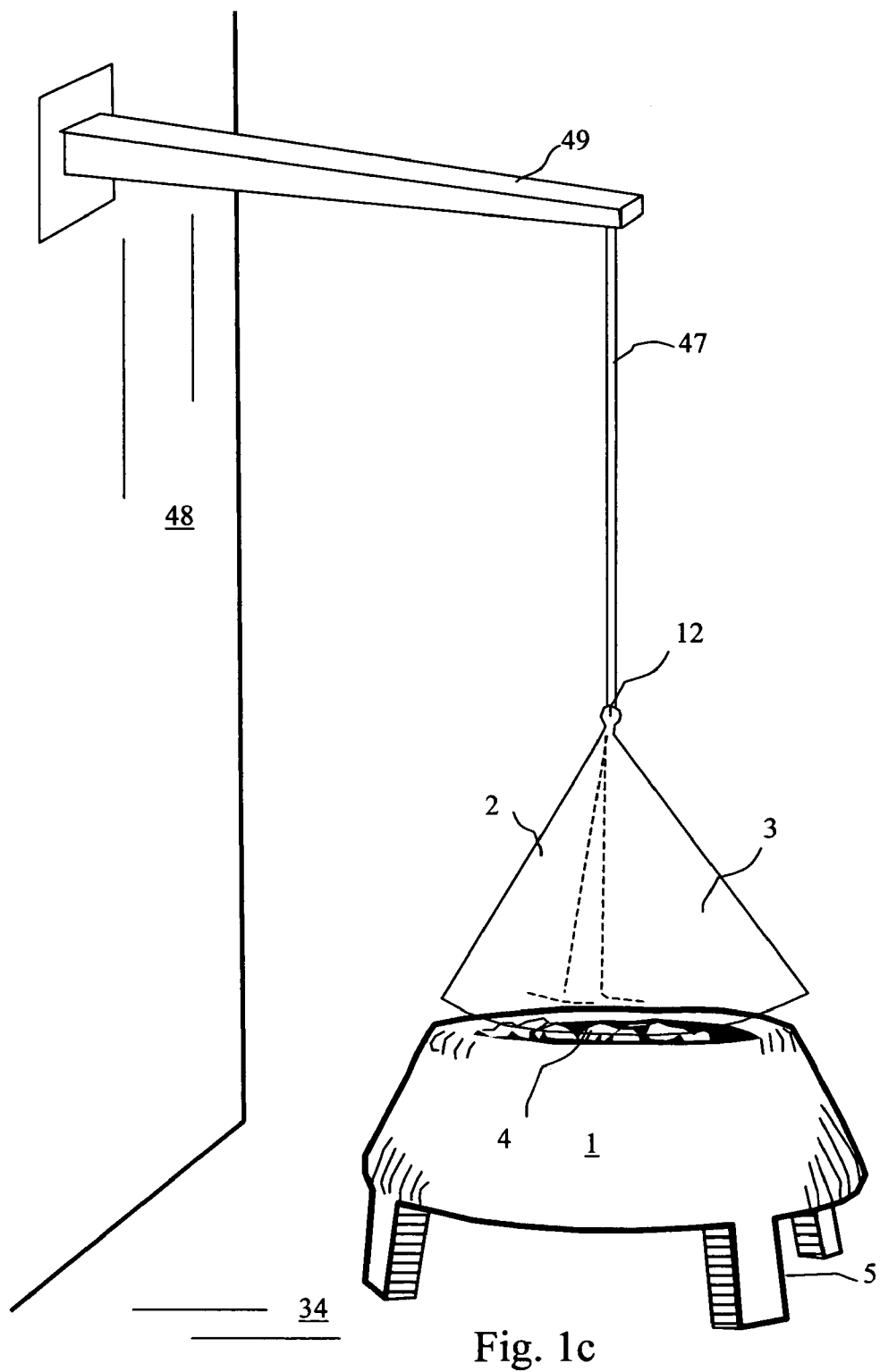
FIG. 1c illustrates the exemplary embodiment of a food dish with a cone shaped cover suspended from an external structure.

FIG. 1c illustrates an exemplary view of a food dish 1 and a swinging assembly 2, which is supported from the top 18 by a flexible member 48. The top end of the flexible member 48 is attached to an arm 49 that is further attached to an exterior structure 48 such as a house or garage. The swinging assembly 2 can be pushed aside from any direction.

Figure 1D:
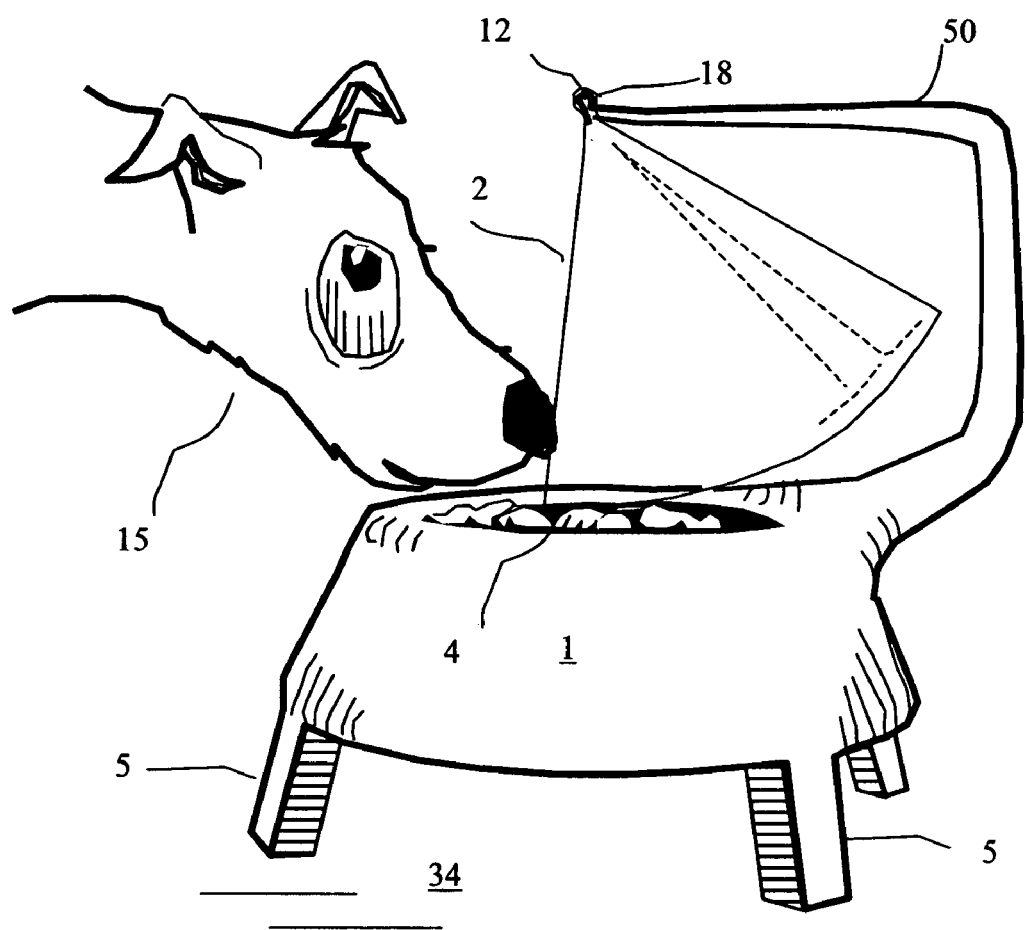
FIG. 1d illustrates the exemplary embodiment of a food dish with a cone shaped cover suspended from an external arm

FIG. 1d illustrates an exemplary view of a food dish 1 and a swinging assembly 2, which is supported from the top 18 by an external arm 50.

Figure 2A:
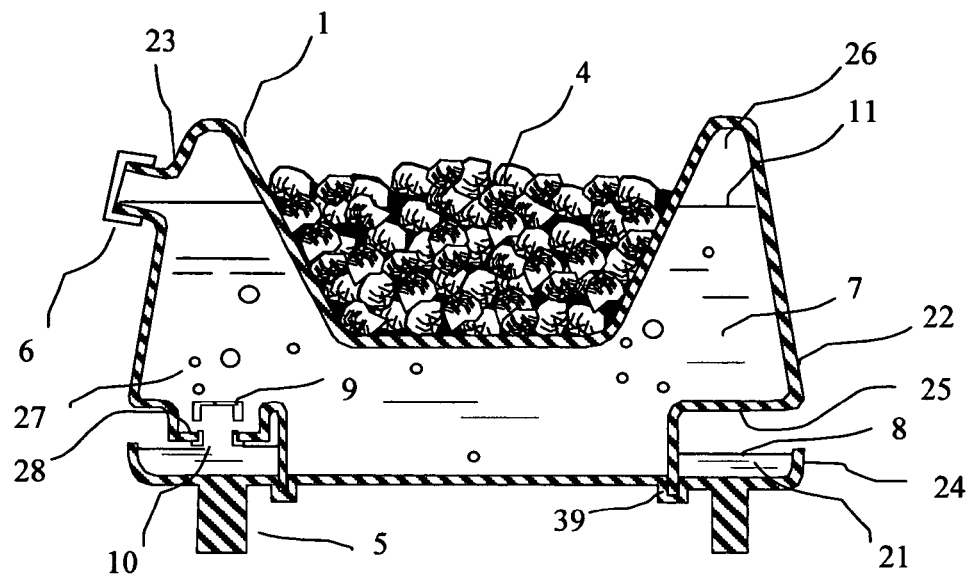
FIG. 2a illustrates an exemplary embodiment of a food dish with a surrounding channel of water and means of supplying water.

FIG. 2a illustrates an exemplary cross-section of a food dish 1 with a surrounding channel of water 21. The food dish 1 is formed as a depression in the top section of an airtight water container 22. The water container 22 may be transparent in order to allow detection of the water level. A cylindrical opening 23 is provided in the top of the water container 22 to provide access for filling the container with water 7. A lid 6 or stopper seals the cylindrical opening 23 and provide for airtight operation after filling. A channel of water 21 is provided which fully surrounds the food dish 1 with water. This channel of water 21 is held by a lip 24 formed towards the base of the water container 22, preferably in such a location as to make it difficult for food 4 to fall into it. One practical method of forming such a protected channel 21 is to form an undercut 25 in the water container 22 thus allowing the water container 22 to protect the water in the channel 21 from dropping food. The lip 24 section of the lower portion of the water container 22 is fastened to the water container 22 by a circular locking lip 39 as is common in airtight food storage containers. This locking lip 39 allows for disassembly and cleaning. It will be appreciated that other structures may be employed to protect the water from falling food, such as a lip that extends over the channel. The surrounding channel of water 21 is sufficiently deep and wide to discourage crawling insects from crossing to the food bowl 1. A hole 10 in the bottom of the water container 22 allows water from inside to chamber 22 to fill the water channel 21. It will be appreciated that the hole 10 may be in the bottom or sides of the water container 22 and may be formed in a variety of shapes. One requirement of the hole 10 is that it be sufficiently large to flow sufficient water 7 from the interior of the water chamber 22 to supply the water channel 21. With the lid 6 in place, a slight vacuum 26 forms in the water container 22 as water flows out through the hole 10. Eventually, the water level 8 in the water channel 21 raises sufficiently that the hole 10 is covered with water and sufficient vacuum 26 forms to keep more water 7 from flowing out the hole 10, thus establishing a level of water 8 in the channel surrounding the food dish 1. As water evaporates from the water channel 21, the hole 10 is uncovered, letting air bubbles 27 rise through the water 7 in the water chamber 22. The bubbles 27 increase the air pressure, thus allowing the water 7 to flow from the water chamber 22 into the water channel 21 until the water level 8 in the channel 21 raises, covering the hole 10 and until the water pressure across the hole 10 equalizes.

Figure 2B:
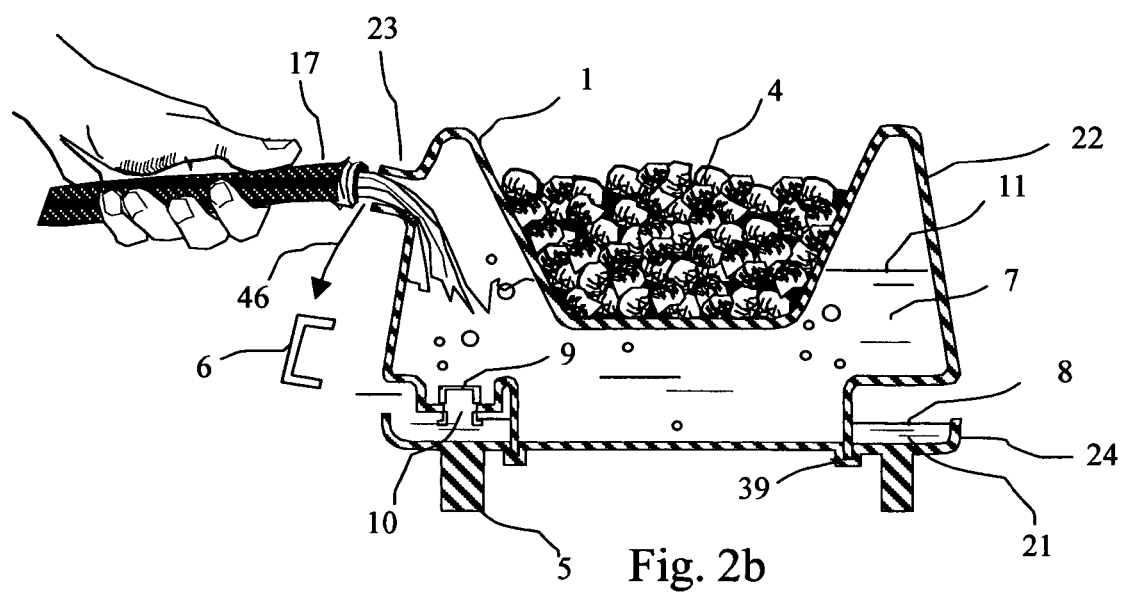
FIG. 2b illustrates the means employed to keep water from rushing out during filling.
Figure 2C:
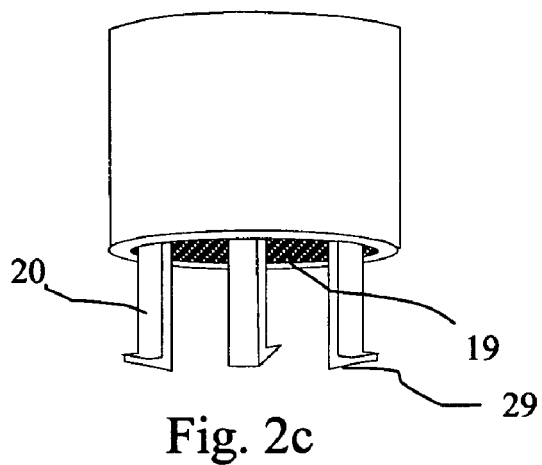
FIG. 2c illustrates the float mechanism used to limit flow of water during filling

FIG. 2b illustrates an exemplary cross sectional view of the feeding system described in FIG. 2a during filling of water 7. Over the course of time, the water level 11 in the water container 22 drops sufficiently that the water 7 in the water chamber 22 needs to be refilled. The chamber is filled through an opening 23 in the top of the water chamber 22. This is done by removing 46 the lid 6 and filling the tank with a water hose 17 or other suitable method. In order to limit the water flow out of the hole 10 from the water container 22 during filling, a float 9 is provided in the area above the hole 10. The float 9 is positioned far enough above the hole 10 to allow sufficient water flow from the hole 10 and close enough to provide a sufficient pressure drop when the container lid 6 is removed to force the float 9 downward onto its sealing surface 28, slowing the movement of water out the hole 10. A small amount of water leakage must be provided to allow the slight vacuum 26 to form again. This leakage may be provided by forming an imperfect seal between the float 9 and the seating surface 28 of the hole 10. It may also be provided by forming a small hole in the seating surface 28. Once the vacuum 26 forms, the float 9 raises, thus allowing sufficient water to flow to the water channel 21. It can be appreciated that without this float 9, the water would rush from the water container 22 during filling, making it difficult and inconvenient to fill. It can also be appreciated that a variety of floats may be employed to stop the outward rush of water during filling FIG. 2c illustrates a view of the float 9. The float 9 has a hollow inner volume 19 which, contains the air in the float 9 and three supports 20 with protrusions 29 which hold the bottom of the seating surface 28 in the vicinity of the hole 10 while the float 9 is raised. The supports 20 also guide the float 9 as it moves to seal the hole 10 during filling.

Figure 3A:
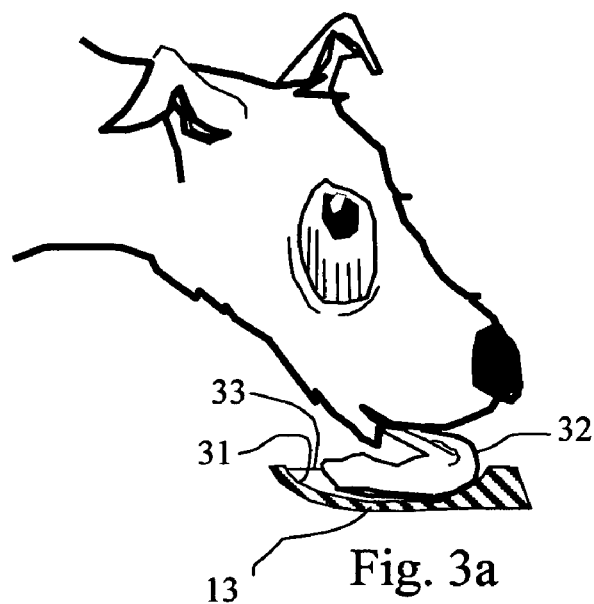
FIG. 3a is an exemplary embodiment of a self-cleaning water dish.

FIG. 3a is an exemplary cross sectional view of a water bowl with self-cleaning features. The volume that the pet drinks from 30 is in the shape of a spoon of sufficient size as to force the pet 15 to lick the surface 31 of the dish 13 with its tongue 32 while lapping the water. It is preferable to make the surface 31 smooth and shallowly curved so that the sensation is pleasant and no areas are formed which can trap food particles or other objects. The sides of the dish 13 may be elevated so as to make it difficult for water to splash out during lapping. This is a feature that would be useful in an indoor environment.

Figure 3B:
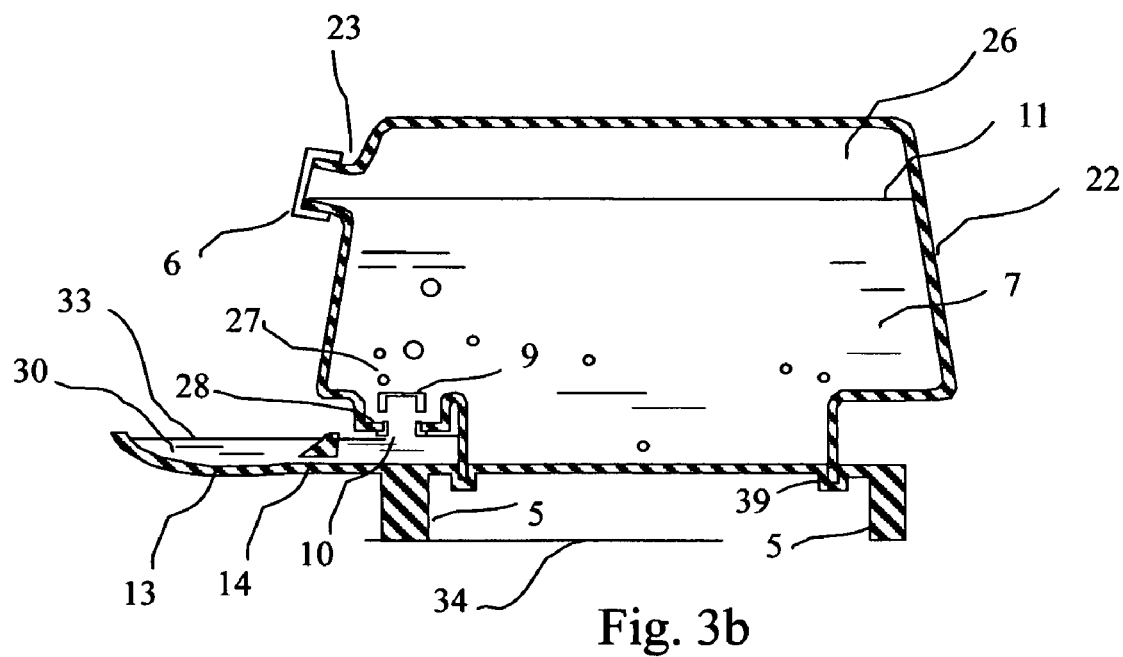
FIG. 3b is an exemplary embodiment of a self cleaning watering dish and water container with means of supplying water between the container and the dish.

FIG. 3b shows the water dish 13 attached to a means of supplying water and controlling the water level in the dish 13. Note that the water dish 13 juts out from the side or back of the water container 22 to provide easy access by the pet 15. The watering dish 13 maintains a level of water 33 by using the same mechanism as described in FIG. 2a, 2b and 2c. The water dish 13 is fed directly through a channel or hole 14 from water contained in the area below the hole 10 in the water container 22. The entire assembly may be elevated above the supporting surface 34 on legs 5 so as to make access to the pet 15 easier while avoiding hiding spots for crawling insects.

Figure 3C:
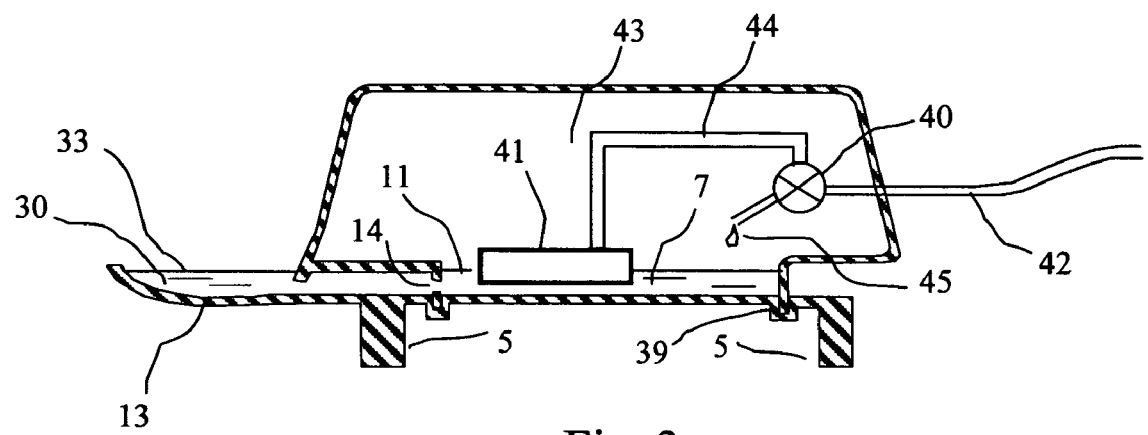
FIG. 3c is an exemplary embodiment of a self cleaning watering dish and water container with means of supplying pressurized water to the watering dish.

FIG. 3c is an exemplary cross sectional view of a water dish 13 supplied by a pressurized water source 42. Pressurized water source 42 is communicated to a holding chamber 43 through a valve 40. Water entering the chamber 45 replenishes the water 7 in the chamber. The valve 40 is actuated by a float 41 through a linkage assembly 44. The float senses the level of the water 11 in the holding chamber 43 and moves the valve 40 to control the water 7 to a preset level 11. The water 7 in the chamber 43 moves through channel 14 to keep the water level 33 in the shallow water dish 13 at a constant level 33 which matches the level of the water 11 in the chamber 43.

Figure 4:
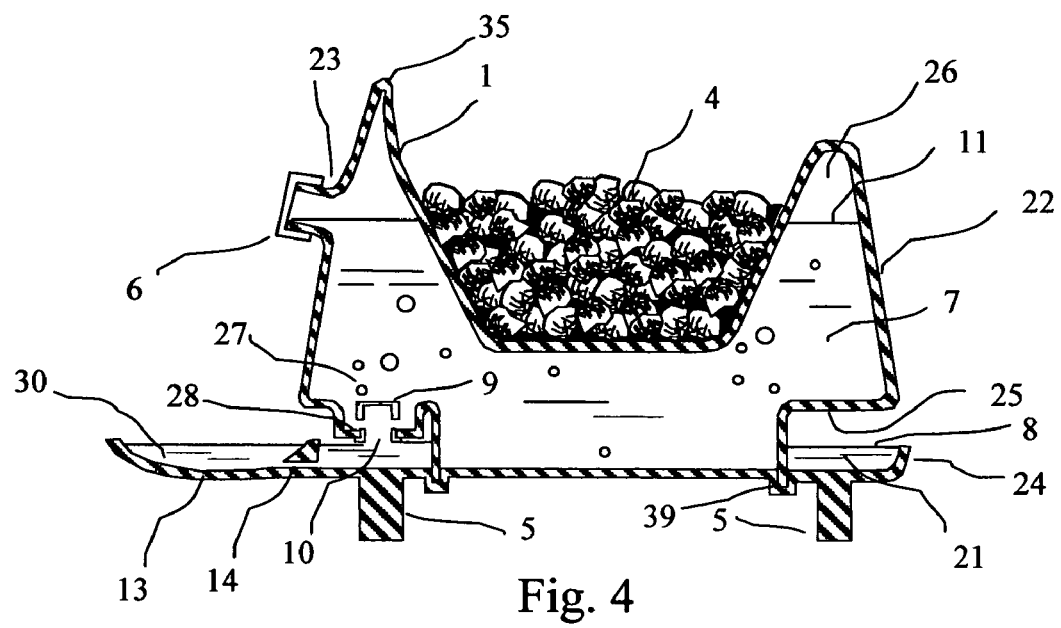
FIG. 4 is an exemplary embodiment of the previous figure combined with a water channel and a food bowl.

FIG. 4 is an exemplary embodiment showing a cross sectional view of the watering dish shown in FIGS. 3a and 3b combined with the water channel 21 and food bowl 1 shown in FIGS. 2a, 2b and 2c. The water in the dish 30 is protected from falling food 4 by a shield 35. Once again, the entire assembly may be elevated above the supporting surface on legs 5 so as to improve access and avoid the hiding of crawling insects.

Figure 5A:
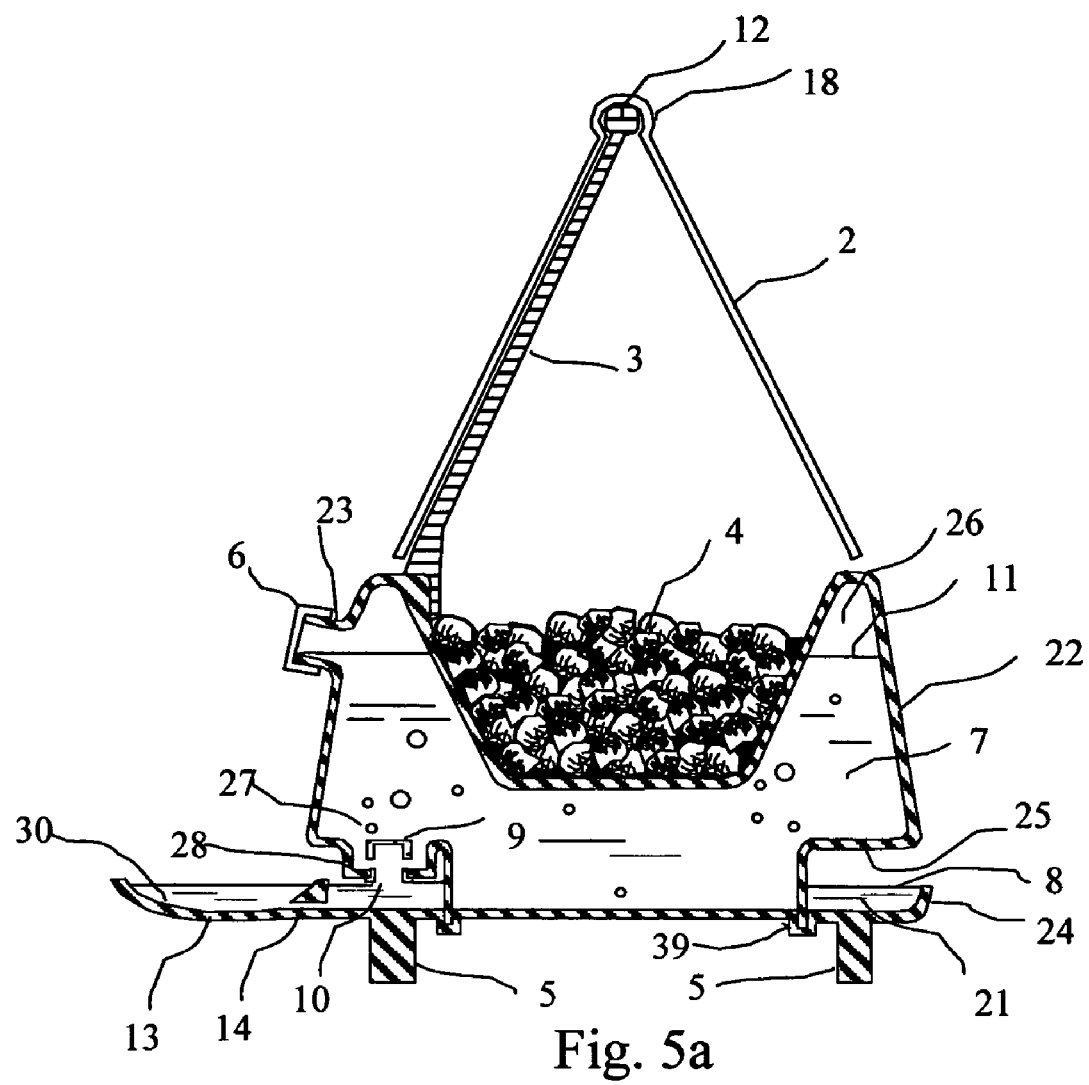
FIG. 5a is an exemplary embodiment of the previous figure combined with a swinging protector.

FIG. 5a is an exemplary embodiment showing a cross sectional view of the previous figure combined with a swinging conical protector 2.

Figure 5B:
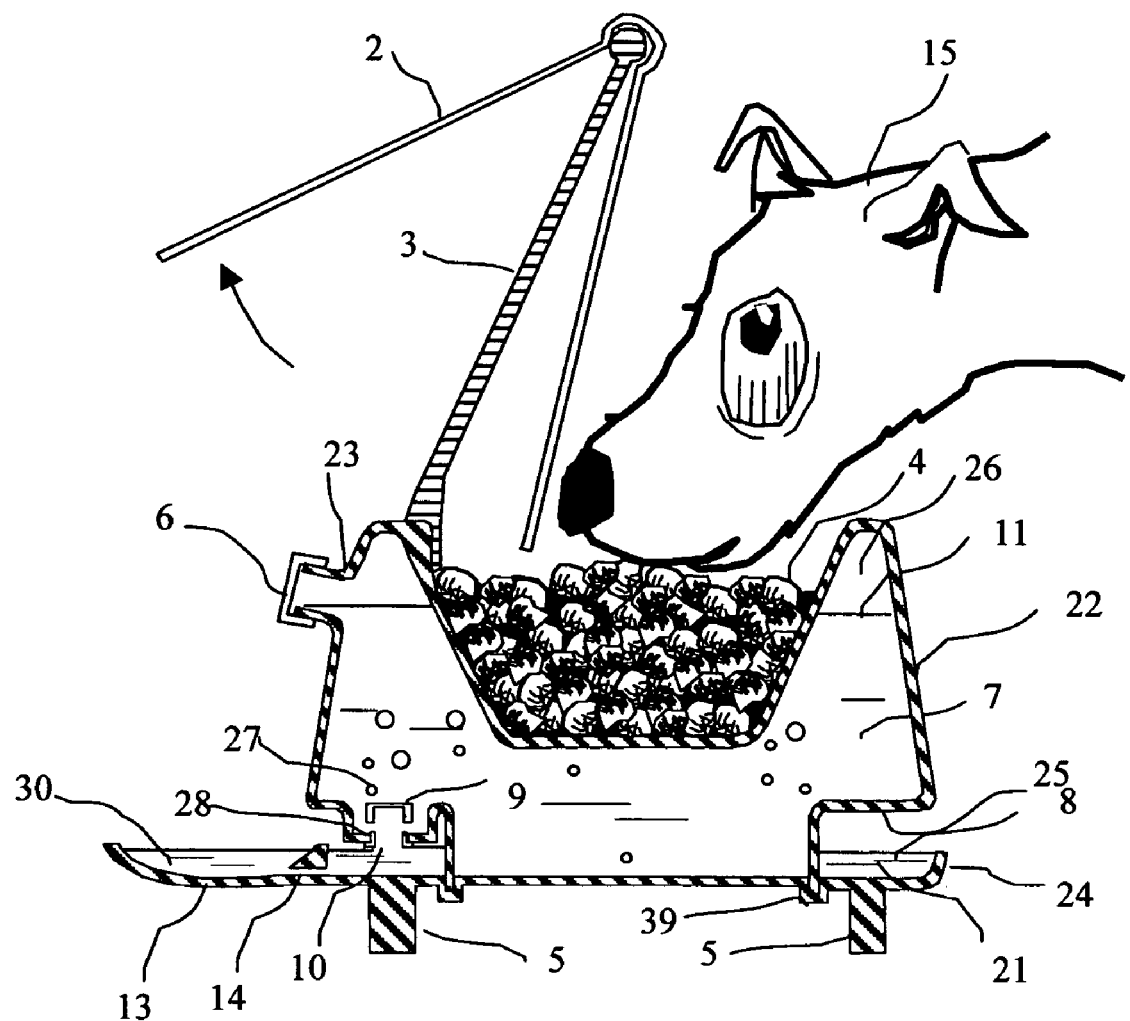
FIG. 5b illustrates the exemplary embodiment shown in FIG. 5a being accessed by a pet.

FIG. 5b shows a cross sectional view of the food feeding system described in FIG. 5a being accessed by a pet 15. Note that the water dish 13 is now shielded from falling food by the swinging conical protector 2 as it swings out and over the water dish 13. Once again, the conical protector 2 is supported above the food bowl in the same fashion as shown in FIGS. 1a and 1b.

Figure 6:
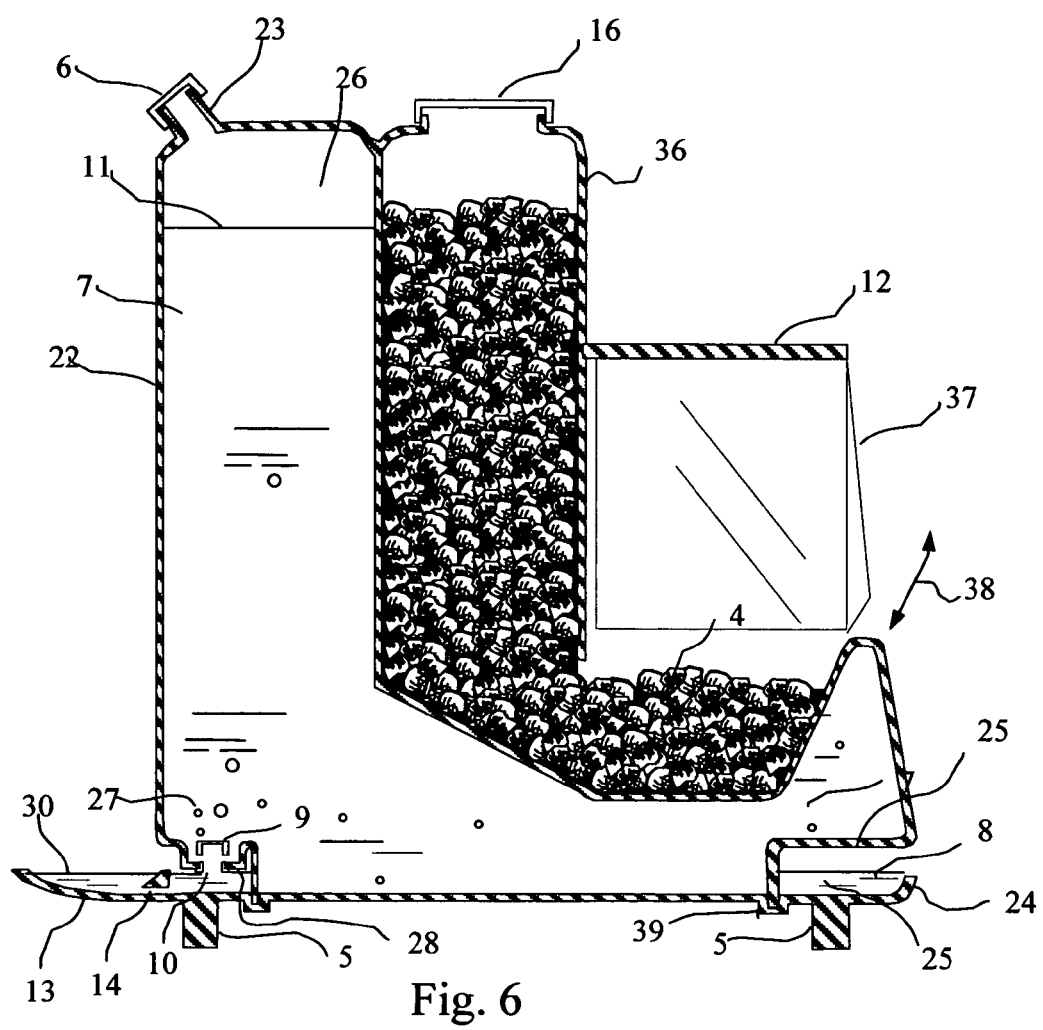
FIG. 6 is an exemplary embodiment of the previous figure with an enlarged water container and a food storage container.

FIG. 6 is an exemplary embodiment of the previous figure with an enlarged water container 22 and a food storage container 36. A swinging assembly 37 is fashioned to swing above the food dish 1 in such a way as to protect the food 4 from birds. In this embodiment, a conical swinging assembly is avoided in favor of a swinging assembly 37 which is hinged on support 12 such as to swing in only one direction 38. This makes the entire assembly more compact and allows the support 12 to come directly from the food storage container 36 or the water storage container 22. A lid 16 is provided for the food storage container. It will be appreciated that the conical protector could be used satisfactorily with large water and food storage containers.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A pet feeding assembly comprising:
   a food container surrounded by a channel of water to stop insects, in fluid communication with a spoon-shaped pet watering dish, wherein the dish is sufficiently sized and shaped to have the dish surfaces cleaned and the water refreshed by the licking action of the pet on virtually every lap, also wherein means are provided to keep the water level in the channel of water and the watering dish as a set level, also wherein means are provided to protect the channel of water from falling food and airborne debris, also wherein the assembly is supported a comfortable distance from the ground;
   wherein the means of keeping the water level at a set level is comprised of an airtight chamber containing water where the chamber is in fluid communication with the channel of water;
   and wherein the opening in the upward portion of the water chamber is closed by and airtight closure.

2. The pet feeding assembly of claim 1 wherein the fluid communication between the water chamber and the channel of water is below or at the surface of the water in the channel.

3. The pet feeding assembly of claim 1 wherein the chamber can be filled from an opening in the upward portion of the water chamber.

4. The pet feeding assembly of claim 2 wherein the chamber can be filled through the channel which provides communication between the water chamber and the channel of water.

5. The pet feeding assembly of claim 3 wherein the fluid communication between the water chamber and the channel of water is closed during filling.

6. The pet feeding assembly of claim 5 wherein the means of closing the fluid communication between the water chamber and the channel of water during filling is a float.

7. The pet feeding assembly of claim 1 wherein the means of keeping the water level at a set level is comprised of a pressurized water source controlled by a float and a valve to modulate the pressurized water source and keep the water level in the channel at a preset level.

8. The pet watering assembly of claim 1 wherein the chamber is composed of two or more sections that can be pulled apart for cleaning.

9. A pet feeding assembly comprising:
   a food container surrounded by a channel of water to stop insects, in fluid communication with a spoon-shaped pet watering dish, wherein the dish is sufficiently sized and shaped to have the dish surfaces cleaned and the water refreshed by the licking action of the pet on virtually every lap, also wherein means are provided to keep the water level in the channel of water and the watering dish as a set level, also wherein means are provided to protect the channel of water from falling food and airborne debris, also wherein means are provided to protect the food from birds and airborne debris, also wherein the assembly is supported a comfortable distance from the ground;
   wherein the means provided to protect the food from birds and airborne debris is comprised of a swinging assembly that is free to swing and alternately cover and expose the container and wherein the resting position of the swing assembly is such as to cover the food in the food container;

and wherein a support assembly extends upwards from the container and inside the swinging assembly.

10. The pet feeding assembly of claim 9 wherein the swinging assembly is easily moved aside by the feeding animal.

11. The pet feeding assembly of claim 9 wherein the swinging assembly is conical in shape.

12. The pet feeding assembly of claim 9 wherein the swinging assembly is suspended by a support assembly extending from the food container.

13. A pet feeding assembly comprising:

a food container surrounded by a channel of water to stop insects, in fluid communication with a spoon-shaped pet watering dish, wherein the dish is sufficiently sized and shaped to have the dish surfaces cleaned and the water refreshed by the licking action of the pet on virtually every lap, also wherein means are provided to keep the water level in the channel of water and the watering dish as a set level, also wherein means are provided to protect the channel of water from falling food and airborne debris, also wherein means are provided to protect the food from birds and airborne debris, also wherein the assembly is supported a comfortable distance from the ground;

wherein the means provided to protect the food from birds and airborne debris is comprised of a swinging assembly that is free to swing and alternately cover and expose the container and wherein the resting position of the swing assembly is such as to cover the food in the food container;

and wherein a support assembly extends upwards from the container and outside the swinging assembly.

14. A pet feeding assembly comprising:

a food container surrounded by a channel of water to stop insects, in fluid communication with a spoon-shaped pet watering dish, wherein the dish is sufficiently sized and shaped to have the dish surfaces cleaned and the water refreshed by the licking action of the pet on virtually every lap, also wherein means are provided to keep the water level in the channel of water and the watering dish as a set level, also wherein means are provided to protect the channel of water from falling food and airborne debris, also wherein means are provided to protect the food from birds and airborne debris, also wherein the assembly is supported a comfortable distance from the ground;

wherein the means provided to protect the food from birds and airborne debris is comprised of a swinging assembly that is free to swing and alternately cover and expose the container and wherein the resting position of the swinging assembly is such as to cover the food in the food container;

and wherein a support assembly attaches to the top of the swinging assembly and the top of the support assembly attaches to an exterior structure.

\* \* \* \* \*